(12) United States Patent
Xu et al.

(10) Patent No.: US 10,808,104 B2
(45) Date of Patent: Oct. 20, 2020

(54) PREPARATION METHOD OF SCRIBING RUBBER CEMENT OF TIRE TREAD

(71) Applicant: Xuzhou College of Industrial Technology, Xuzhou, Jiangsu (CN)

(72) Inventors: Yunhui Xu, Jiangsu (CN); Peipei Li, Jiangsu (CN); Zaixue Wang, Jiangsu (CN); Yue Cao, Jiangsu (CN)

(73) Assignee: Xuzhou College of Industrial Technology, Xuzhou (CN)

(*) Notice: Subject to any disclaimer, the term of this patent is extended or adjusted under 35 U.S.C. 154(b) by 351 days.

(21) Appl. No.: 15/917,863

(22) Filed: Mar. 12, 2018

(65) Prior Publication Data
US 2019/0276646 A1    Sep. 12, 2019

(51) Int. Cl.
| C08L 7/00 | (2006.01) |
| B60C 1/00 | (2006.01) |
| C08C 4/00 | (2006.01) |
| C08K 3/06 | (2006.01) |
| C08K 3/22 | (2006.01) |
| C08K 5/09 | (2006.01) |
| C08K 5/47 | (2006.01) |

(52) U.S. Cl.
CPC .............. C08L 7/00 (2013.01); B60C 1/0016 (2013.01)

(58) Field of Classification Search
USPC ..... 366/72, 97; 156/96, 209, 910; 524/575.5
See application file for complete search history.

(56) References Cited

U.S. PATENT DOCUMENTS

| 4,359,452 A * | 11/1982 | Shim .................. C01B 17/12 423/265 |
| 4,629,758 A * | 12/1986 | Kawaguchi .............. C08J 5/125 524/495 |
| 4,902,370 A * | 2/1990 | Dust .......................... C09J 5/00 156/327 |
| 8,143,338 B1 * | 3/2012 | Pompei .................. B29D 30/54 524/474 |

OTHER PUBLICATIONS

Jesionowski, et al, "Modified Titanium White—Characteristics and Application," Physicochemical Problems of Mineral Processing, 35 (2001), 195-205. (Year: 2001).*
Shangyichem Product Brochure: Rubber Accelerator, 3 pages, retrieved from the internet: www.shangyichem.com/product_detail6_en/Rubber-Accelerator.html, Copyright (C) 2014. (Year: 2014).*

* cited by examiner

*Primary Examiner* — Fred M Teskin
(74) *Attorney, Agent, or Firm* — Wayne & Ken, LLC; Tony Hom

(57) ABSTRACT

The present invention discloses a preparation method of scribing rubber cement of a tire tread. The scribing rubber cement of the tire tread is prepared from the following raw materials in parts by weight: 100 parts of natural rubber; 3.5 to 4.5 parts of zinc oxide; 1.5 to 2.5 parts of stearic acid; 15 to 25 parts of titanium white; 2.5 to 3.5 parts of insoluble sulfur; 0.9 to 1.1 parts of accelerant DM; 0.9 to 1.1 parts of rosin; and 15 to 25 parts of color masterbatch. The preparation method of the scribing rubber cement comprises the following steps: step 1) preparing rubber compound; and step 2) preparing the scribing rubber cement. The scribing rubber cement of the tire tread prepared by the present invention has high aesthetic degree and does not influence the product quality.

8 Claims, No Drawings

PREPARATION METHOD OF SCRIBING RUBBER CEMENT OF TIRE TREAD

TECHNICAL FIELD

The present invention belongs to the field of manufacturing of tires, and particularly relates to a preparation method of scribing rubber cement of a tire tread.

BACKGROUND

Each tire company produces various types and specifications of tires; and in order to distinguish and manage different types and specifications of tires and enable a vulcanized tire to have certain decorative effect, one to five color marking lines may be drawn on a tread by virtue of a tread scribing apparatus in a tire extrusion process. However, to ensure that scribed lines of the tread are uniform and beautiful, the formula and the manufacturing method of the scribing rubber cement of the tire tread are very important. Therefore, an invention patent "a formula and preparation method of scribing rubber cement of a tire tread" is proposed.

SUMMARY

In order to overcome the defects of the prior art, the present invention provides a preparation method of scribing rubber cement of a tire tread. The scribing rubber cement of the tire tread is prepared from the following raw materials in parts by weight:

100 parts of natural rubber; 3.5 to 4.5 parts of zinc oxide; 1.5 to 2.5 parts of stearic acid; 15 to 25 parts of titanium white; 2.5 to 3.5 parts of insoluble sulfur; 0.9 to 1.1 parts of accelerant DM; 0.9 to 1.1 parts of rosin; and 15 to 25 parts of color masterbatch.

The preparation method of the scribing rubber cement comprises the following steps:

step 1) preparing rubber compound:

preparing raw rubber: performing tire baking using natural rubber in a tire baking room with a temperature of 50° C. to 70° C., wherein the tire baking time in three seasons, i.e. spring, summer and autumn is 24 h to 36 h and the tire baking time in winter is 36 h to 72 h, cutting the rubber after the rubber is baked, weighing, and plasticating;

preparing a compounding agent: weighing all raw materials by weight parts;

preparing the rubber compound: preparing by adopting an open mill, performing roll covering on the plasticated natural rubber, and then successively adding the stearic acid, the accelerant DM, the zinc oxide, the rosin, the titanium white, the color masterbatch, and insoluble sulfur; and sheeting after the cement is uniformly mixed, wherein the thickness of a rubber sheet is 2.0 mm to 4.0 mm, and the storage time is 8 h to 48 h;

step 2) preparing the scribing rubber cement preparing rubber blocks: cutting the uniformly mixed scribing rubber cement into small rubber sheets, wherein the thickness is 2.0 mm to 4.0 mm, the width is 10 mm to 20 mm, and the length is 20 mm to 50 mm;

preparing the scribing rubber cement: putting the prepared rubber sheet into a beating machine; then adding gasoline, wherein a mass ratio of the rubber sheet to the gasoline is 1:(2 to 4); covering an opening of the beating machine, and beginning to stir; gradually dissolving the rubber under the continuous stirring of blades of the beating machine, and preparing the uniform scribing rubber cement; and storing the rubber cement: after the scribing rubber cement is prepared, storing the scribing rubber cement in a closed cement storing container, and placing the container in a shade place with a temperature of 20° C. for 24 h to 36 h.

The gasoline is national standard No. 93 or No. 97 or No. 120 gasoline.

The weight ratio of the rubber sheet to the gasoline is 1:3.

A Williames plasticity number of the scribing rubber cement is 1.5 to 4.

The pH of the scribing rubber cement is 7 to 10.

DETAILED DESCRIPTION

The present invention is further described below through embodiments.

Embodiment 1

A preparation method of scribing rubber cement of a tire tread comprises the following raw materials in parts by weight:

100 parts of natural rubber; 3.5 parts of zinc oxide; 1.5 parts of stearic acid; 15 parts of titanium white; 2.5 parts of insoluble sulfur; 0.9 part of accelerant DM; 0.9 part of rosin; and 15 parts of color masterbatch.

The preparation method of the scribing rubber cement comprises the following steps:

step 1) preparing rubber compound:

preparing raw rubber: performing tire baking using natural rubber in a tire baking room with a temperature of 50° C., wherein the tire baking time is 36 h, cutting the rubber after the rubber is baked, weighing, and plasticating;

preparing a compounding agent: weighing all raw materials by weight parts;

preparing the rubber compound: preparing by adopting an open mill, performing roll covering on the plasticated natural rubber, and then successively adding the stearic acid, the accelerant DM, the zinc oxide, the rosin, the titanium white, the color masterbatch, and insoluble sulfur; and sheeting after the cement is uniformly mixed, wherein the thickness of a rubber sheet is 2.0 mm, and the storage time is 8 h;

step 2) preparing the scribing rubber cement preparing rubber blocks: cutting the uniformly mixed scribing rubber cement into small rubber sheets, wherein the thickness is 2.0 mm, the width is 10 mm, and the length is 20 mm;

preparing the scribing rubber cement: putting the prepared rubber sheet into a beating machine; then adding gasoline, wherein a mass ratio of the rubber sheet to the gasoline is 1:2; covering an opening of the beating machine, and beginning to stir; gradually dissolving the rubber under the continuous stirring of blades of the beating machine, and preparing the uniform scribing rubber cement; and storing the rubber cement: after the scribing rubber cement is prepared, storing the scribing rubber cement in a closed cement storing container, and placing the container in a shade place with a temperature of 20° C. for 24 h.

The gasoline is national standard No. 93 or No. 97 or No. 120 gasoline.

A Williames plasticity number of the scribing rubber cement is 1.5 to 4.

The pH of the scribing rubber cement is 7.

Embodiment 2

A preparation method of scribing rubber cement of a tire tread comprises the following raw materials in parts by weight:

100 parts of natural rubber; 4 parts of zinc oxide; 2 parts of stearic acid; 20 parts of titanium white; 3 parts of insoluble sulfur; 1 part of accelerant DM; 1 part of rosin; and 20 parts of color masterbatch.

The preparation method of the scribing rubber cement comprises the following steps:

step 1) preparing rubber compound:

preparing raw rubber: performing tire baking using natural rubber in a tire baking room with a temperature of 60° C., wherein the tire baking time is 60 h and the tire baking time in winter is 36 h to 72 h, cutting the rubber after the rubber is baked, weighing, and plasticating;

preparing a compounding agent: weighing all raw materials by weight parts;

preparing the rubber compound: preparing by adopting an open mill, performing roll covering on the plasticated natural rubber, and then successively adding the stearic acid, the accelerant DM, the zinc oxide, the rosin, the titanium white, the color masterbatch, and insoluble sulfur; and sheeting after the cement is uniformly mixed, wherein the thickness of a rubber sheet is 3.0 mm, and the storage time is 24 h;

step 2) preparing the scribing rubber cement preparing rubber blocks: cutting the uniformly mixed scribing rubber cement into small rubber sheets, wherein the thickness is 3.0 mm, the width is 15 mm, and the length is 40 mm;

preparing the scribing rubber cement: putting the prepared rubber sheet into a beating machine; then adding gasoline, wherein a mass ratio of the rubber sheet to the gasoline is 1:3; covering an opening of the beating machine, and beginning to stir; gradually dissolving the rubber under the continuous stirring of blades of the beating machine, and preparing the uniform scribing rubber cement; and storing the rubber cement: after the scribing rubber cement is prepared, storing the scribing rubber cement in a closed cement storing container, and placing the container in a shade place with a temperature of 20° C. for 30 h.

The gasoline is national standard No. 93 or No. 97 or No. 120 gasoline.

The weight ratio of the rubber sheet to the gasoline is 1:3.

A Williames plasticity number of the scribing rubber cement is 3.

The pH of the scribing rubber cement is 10.

Embodiment 3

A preparation method of scribing rubber cement of a tire tread comprises the following raw materials in parts by weight:

100 parts of natural rubber; 4.5 parts of zinc oxide; 2.5 parts of stearic acid; 25 parts of titanium white; 3.5 parts of insoluble sulfur; 1.1 parts of accelerant DM; 1.1 parts of rosin; and 25 parts of color masterbatch.

The preparation method of the scribing rubber cement comprises the following steps:

step 1) preparing rubber compound:

preparing raw rubber: performing tire baking using natural rubber in a tire baking room with a temperature of 70° C., wherein the tire baking time is 72 h, cutting the rubber after the rubber is baked, weighing, and plasticating;

preparing a compounding agent: weighing all raw materials by weight parts;

preparing the rubber compound: preparing by adopting an open mill, performing roll covering on the plasticated natural rubber, and then successively adding the stearic acid, the accelerant DM, the zinc oxide, the rosin, the titanium white, the color masterbatch, and insoluble sulfur; and sheeting after the cement is uniformly mixed, wherein the thickness of a rubber sheet is 4.0 mm, and the storage time is 48 h;

step 2) preparing the scribing rubber cement preparing rubber blocks: cutting the uniformly mixed scribing rubber cement into small rubber sheets, wherein the thickness is 4.0 mm, the width is 20 mm, and the length is 50 mm;

preparing the scribing rubber cement: putting the prepared rubber sheet into a beating machine; then adding gasoline, wherein a mass ratio of the rubber sheet to the gasoline is 1:4; covering an opening of the beating machine, and beginning to stir; gradually dissolving the rubber under the continuous stirring of blades of the beating machine, and preparing the uniform scribing rubber cement; and storing the rubber cement: after the scribing rubber cement is prepared, storing the scribing rubber cement in a closed cement storing container, and placing the container in a shade place with a temperature of 20° C. for 36 h.

The gasoline is national standard No. 93 or No. 97 or No. 120 gasoline.

A Williames plasticity number of the scribing rubber cement is 4.

The pH of the scribing rubber cement is 10.

| Control indexes of the scribing rubber cement | | | |
|---|---|---|---|
| Name of rubber | Rubber sheet: gasoline | PH | Williames plasticity number |
| Scribing rubber cement | 1: (2-4) | 7-11 | 1.5-4 |

What is claimed is:

1. A preparation method of scribing rubber cement of a tire tread, comprising the following raw materials in parts by weight:
    100 parts of natural rubber; 3.5 to 4.5 parts of zinc oxide; 1.5 to 2.5 parts of stearic acid; 15 to 25 parts of titanium white; 2.5 to 3.5 parts of insoluble sulfur; 0.9 to 1.1 parts of accelerant DM; 0.9 to 1.1 parts of rosin; and 15 to 25 parts of color masterbatch;
    the preparation method of the scribing rubber cement comprising the following steps:
    step 1) preparing rubber compound:
    preparing raw rubber: performing tire baking using natural rubber in a tire baking room with a temperature of 50° C. to 70° C., wherein the tire baking time in three seasons, i.e. spring, summer and autumn is 24 h to 36 h and the tire baking time in winter is 36 h to 72 h, cutting the rubber after the rubber is baked, weighing, and plasticating;
    preparing a compounding agent: weighing all raw materials by weight parts;
    preparing the rubber compound: preparing by adopting an open mill, performing roll covering on the plasticated natural rubber, and then successively adding the stearic acid, the accelerant DM, the zinc oxide, the rosin, the titanium white, the color masterbatch, and insoluble sulfur; and sheeting after the cement is uniformly mixed, wherein the thickness of a rubber sheet is 2.0 mm to 4.0 mm, and the storage time is 8 h to 48 h;
    step 2) preparing the scribing rubber cement
    preparing rubber blocks: cutting the uniformly mixed scribing rubber cement into small rubber sheets, wherein the thickness is 2.0 mm to 4.0 mm, the width is 10 mm to 20 mm, and the length is 20 mm to 50 mm;

preparing the scribing rubber cement: putting the prepared rubber sheet into a beating machine; then adding gasoline, wherein a mass ratio of the rubber sheet to the gasoline is 1:(2 to 4); covering an opening of the beating machine, and beginning to stir; dissolving the rubber under the continuous stirring of blades of the beating machine, and preparing the uniform scribing rubber cement; and storing the rubber cement: after the scribing rubber cement is prepared, storing the scribing rubber cement in a closed cement storing container, and placing the container in a dark place with a temperature of 20° C. for 24 h to 36 h.

2. The preparation method of the scribing rubber cement of the tire tread according to claim 1, wherein the gasoline is national standard No. 93 or No. 97 or No. 120 gasoline.

3. The preparation method of the scribing rubber cement of the tire tread according to claim 1, wherein the weight ratio of the rubber sheet to the gasoline is 1:3.

4. The preparation method of the scribing rubber cement of the tire tread according to claim 2, wherein the weight ratio of the rubber sheet to the gasoline is 1:3.

5. The preparation method of the scribing rubber cement of the tire tread according to claim 1, wherein a Williames plasticity number of the scribing rubber cement is 1.5 to 4.

6. The preparation method of the scribing rubber cement of the tire tread according to claim 2, wherein a Williames plasticity number of the scribing rubber cement is 1.5 to 4.

7. The preparation method of the scribing rubber cement of the tire tread according to claim 5, wherein the pH of the scribing rubber cement is 7 to 10.

8. The preparation method of the scribing rubber cement of the tire tread according to claim 5, wherein the pH of the scribing rubber cement is 7 to 10.

* * * * *